United States Patent [19]

Yamauchi et al.

[11] Patent Number: 4,834,786

[45] Date of Patent: May 30, 1989

[54] METHOD OF MANUFACTURING A PREFORM FOR ASYMMETRICAL OPTICAL FIBER

[75] Inventors: Ryozo Yamauchi; Matsuhiro Miyamoto; Tatsuyuki Oohashi, all of Sakura; Osamu Fukuda, Narashino, all of Japan

[73] Assignee: Fujikura Ltd., Tokyo, Japan

[21] Appl. No.: 68,223

[22] Filed: Jun. 29, 1987

[30] Foreign Application Priority Data

Jul. 3, 1986 [JP] Japan ................. 61-157007

[51] Int. Cl.$^4$ .......................................... C03B 37/018
[52] U.S. Cl. ..................... 65/3.12; 65/4.21; 65/18.2; 427/163; 427/167
[58] Field of Search ............... 65/3.1, 3.11, 3.12, 65/3.2, 13, 18.2, 18.4, 36, 42, 144, 4.21, 43; 427/163, 167; 118/730

[56] References Cited

U.S. PATENT DOCUMENTS

| | | | |
|---|---|---|---|
| 3,637,434 | 1/1972 | Nakamura et al. | 118/730 |
| 3,775,075 | 11/1973 | Keck et al. | 65/31 |
| 4,062,318 | 12/1977 | Ban et al. | 118/730 |
| 4,217,027 | 8/1980 | MacChesney et al. | 350/96.3 |
| 4,359,267 | 11/1982 | Appez | 427/163 |
| 4,395,270 | 7/1983 | Blankenship et al. | 65/3.12 |
| 4,428,979 | 1/1984 | Nakamura | 427/167 |
| 4,561,871 | 12/1985 | Berkey | 65/3.11 |

OTHER PUBLICATIONS

Fourth International Conference on Integrated Optics and Optical Fiber Communication; Post-Deadline Paper, Technical Digest (Jun. 27-30, 1983).

Primary Examiner—Kenneth M. Schor
Attorney, Agent, or Firm—Frishauf, Holtz, Goodman & Woodward

[57] ABSTRACT

Disclosed is a method of manufacturing a preform for an asymmetric optical fiber which comprises the steps of (a) fixing plural transparent glass rods involving at least one core-mother rod functioning as the core in said optical fiber in parallel relationship, (b) depositing glass soot around an assembly of said plural parallel fixed glass rods, thereby providing a single porous cladding bearing the predetermined shape, and (c) vitrifying the porous cladding by thermal fusion, thereby providing the entirely integral transparent preform. The above method does not involve any process of perforating a drilled-pore which is needed inevitably in conventional method. Therefore, it is possible to obtain a long preform with high dimensional precision, and to fabricate the optical fiber with low transmission loss.

12 Claims, 7 Drawing Sheets

METHOD OF MANUFACTURING A PREFORM FOR ASYMMETRICAL OPTICAL FIBER

BACKGROUND OF THE INVENTION

This invention relates to a method of manufacturing an optical fiber-preform, and more particularly to a method of manufacturing a preform for an asymmetrical optical fiber.

Figure 1:
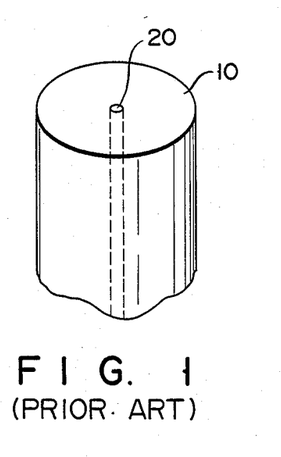
FIG. 1 illustrates the structure of the ordinary symmetrical optical fiber.

As used herein, the term "asymmetrical optical fiber" is defined to mean that type wherein a common glass cylindrical cladding contains a plural fibers prepared from the glass having different properties from the cladding glass; all the fiber act as core, or some of them function as stress-applying parts; all the glass fibers are integrally embedded in the cladding; and at least one of the plural glass fibers is positioned apart from the central axis of the cladding. In contrast, as shown in FIG. 1, the conventional single mode optical fiber contains only one core 20 extending along the central axis of cladding 10.

Figure 2A:
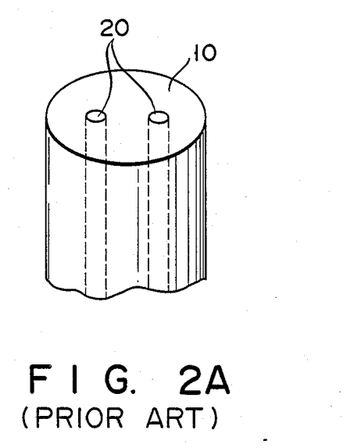
FIGS. 2A to 2C respectively set forth the various asymmetrical optical fibers.
Figure 2B:
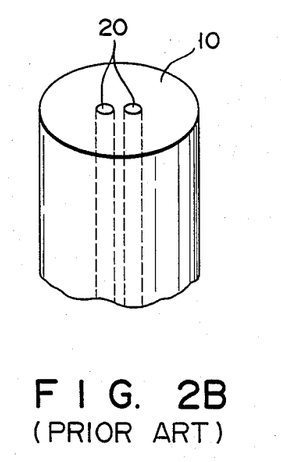
Figure 2C:
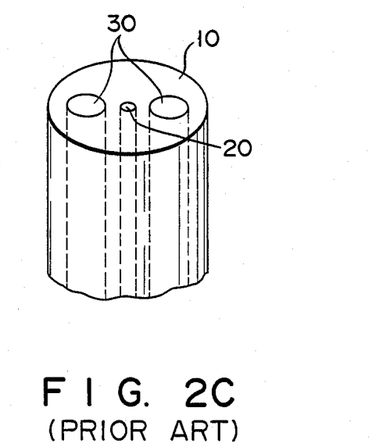

Description may now be made with reference to FIGS. 2A TO 2C of an asymmetrical optical fiber. FIG. 2A or 2B represents a first example of an asymmetrical optical fiber. Throughout the figures set forth, reference numeral 10 denotes a cladding. Two cores 20 are lengthwise embedded in cladding 10. Core 20 is formed of the glass having a larger refractive index than that of cladding 10 so as to cause light beams transmitted through core 20 to perform a substantially total reflection at an interface between cladding 10 and core 20. Two cores are positioned apart from the central axis of cladding 10.

Referring to the above-mentioned twin-core type optical fiber, the type of FIG. 2A wherein two cores 20 are as spaced from each other as to prevent light beams passing therethrough from interfering each other can be applied as a sensor, if two cores 20 are made to have different properties. When external environmental factors such as atmospheric temperature and pressure are applied to the optical fiber, changes appear in the state of light transmitting through cores 20. If cores 20 are let to have different properties in advance, it is possible to detect the magnitude of received external environmental factors from the difference between the state of light in one core and that in the other core.

If two cores 20 are positioned near to each other as shown in FIG. 2B, then light transmitted therethrough can be coupled together. Therefore, the twin-core type optical fiber can be applied as a coupler or isolator.

A second example of asymmetrical optical fiber shown in FIG. 2C is referred to as "a polarization-maintaining optical fiber." In the second example of FIG. 2C, only one core 20 extends along the central axis of cladding 10. Two stress-applying parts 30 are embedded lengthwise in cladding 10. Stress-applying parts 30 are prepared from glass material having a larger thermal expansion coefficient than cladding 10.

The above-mentioned polarization-maintaining optical fiber is characterized in that even when light is transmitted while the fibers are warped, the polarization at the input end can be sustained even though light is transmitted through a long distance. Therefore, said polarization-maintaining optical fiber can be applied in a wide field including a sensor like a fiber gyroscope and coherent optical communication based on only a particular polarization of light.

In obtaining an asymmetrical optical fiber, a pre-form which is previously manufactured by the method described below is elongated to have the predetermined diameter.

The conventional method of manufacturing a pre-form for an asymmetrical optical fiber involves the rod-in-tube method or pit-in-tube method. Description may now be made of these prior art methods.

Figure 3A:
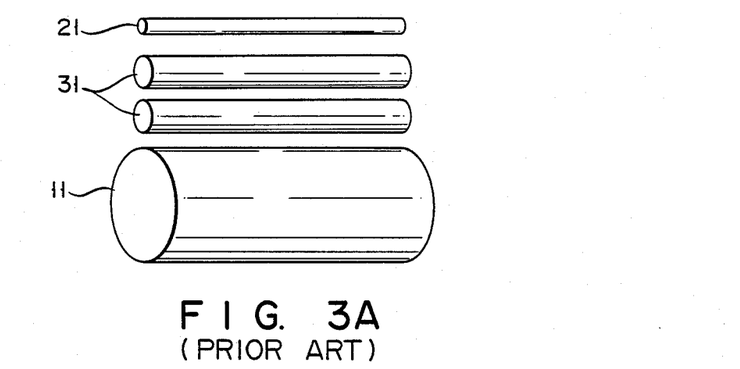
FIGS. 3A to 3D show the conventional method of manufacturing a preform for an asymmetrical optical fiber.

As illustrated in FIG. 3A, cladding-mother rod 11, core-mother rod 21, stress-applying-mother rods 31 are provided in advance. Mother rods 11, 21, 31 can be produced by the widely known processes such as VAD (vapor-phase axial deposition), OVPO (outside vapor phase oxidation) and MCVD (modified chemical vapor deposition).

Figure 3B:
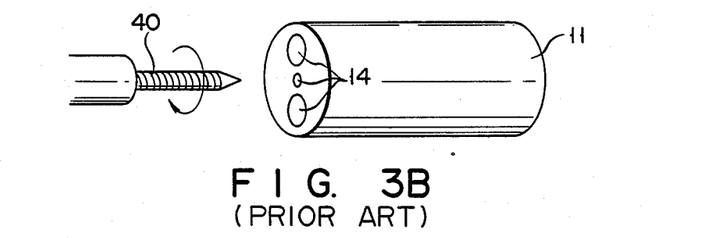
Figure 3C:
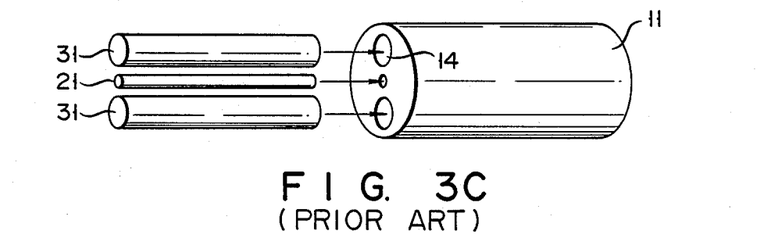

Thereafter, holes 14 for insertion of core-mother rod 21 and stress-applying-mother rod 31 are perforated in cladding-mother rod 11 by means of drill 40. Each hole 14 is mentioned as "drilled-pore" hereinafter. Later as shown in FIG. 3C, core-mother rod 21 and stress-applying-mother rod 31 are inserted into corresponding drilled pore 14.

Figure 3D:
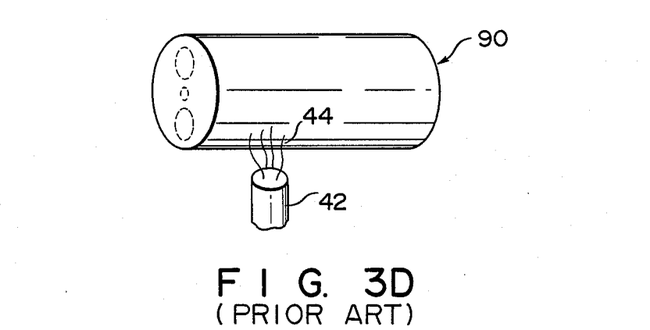

Later as indicated in FIG. 3D, heating is externally applied to cladding-mother rod 11 by means of, for example, flames 44 of burner 42. Thus, the boundaries between the inserted mother rods 21, 31 and cladding-mother rod 11 are fused together, thereby providing a perfectly integrated transparent preform 90.

The preform for the twin-core type optical fiber shown in FIGS. 2A and 2B is fabricated in the same manner mentioned above.

The conventional rod-in-tube process and pit-in-tube process are accompanied with the under mentioned difficulties. First, limitation has to be imposed on the size of a preform to be obtained. If it is attempted to obtain a long preform, a necessarily long drilled-pore 14 will have to be perforated in cladding-mother rod 11. However, any present technique cannot perforate such a long drilled pore through a glass rod, thus imposing a certain limitation on the length of a preform to be fabricated.

Secondly, impurity contamination or scratches tend to appear on the inner wall of drilled pore 14 or the surface of core-mother rod 21 and stress-applying mother rod 31. Therefore, when the preform is drawn to provide an optical fiber, an impurity may diffuse into the core or bubbles will appear in the fiber. These events lead to the transmission loss of light passing through the core

SUMMARY OF THE INVENTION

This invention has been accomplished in view of the above-mentioned circumstances and is intended to provide a method of manufacturing a preform for an asymmetrical optical fiber, which can resolve the aforementioned difficulties accompanying the conventional process and ensure the manufacture of a long asymmetric optical fiber and can obtain low transmission loss.

To attain the above-mentioned object, the present invention provides a method of manufacturing a pre-form for an asymmetric optical fiber which comprises:
(a) The step of fixing a plurality of transparent glass rods in parallel relationship;
(b) depositing glass soot around said fixed glass rod, thereby providing a single porous glass layer having the predetermined shape so as to wrap the plural glass rods; and (c) thermally fusing the porous glass layer, thereby fabricating an entirely integrated transparent preform.

DETAILED DESCRIPTION OF THE PREFERRED EMBODIMENTS

Figure 4A:
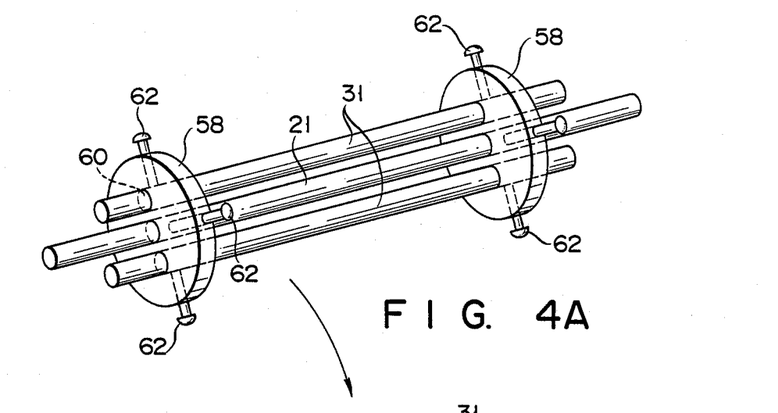
FIGS. 4A to 4C indicate the sequential steps of manufacturing a preform for the polarization-maintaining optical fiber of FIG. 2C representing the present invention.
Figure 4B:
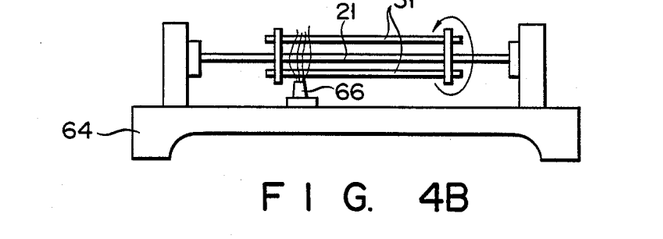
Figure 4C:
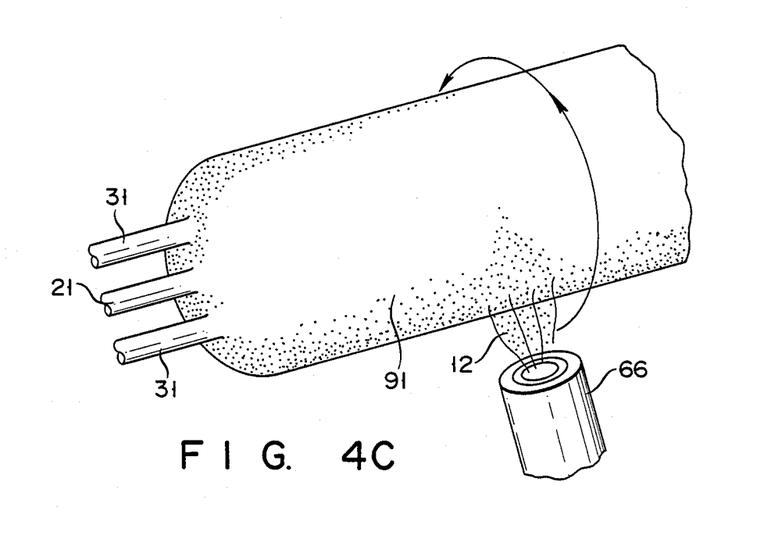

FIGS. 4A to 4C collectively show a method of manufacturing a preform for a polarization-maintaining optical fiber of FIG. 2C, embodying the present invention. According to this embodiment, core-mother rod 21 and two stress-applying-mother rods 31, 31 are first provided. These mother rods are arranged parallel as illustrated in FIG. 4A, and securely set by means of a pair of disc-shaped fixing jigs 58. Three rod-inserting holes 60 are perforated in a line in disc-shaped paired fixing jigs 58. Core-mother rod 21 is taken into the central rod hole, and stress-applying-mother rods 31, 31 are inserted into two rod holes formed on both sides of the central hole. Mother rods 21, 31, 31 are securely set in place by bolt 62 threadedly inserted radially into disc-shaped jig 58.

Above-mentioned core-mother rod 21 and stress-applying-mother rods 31, 31 can be manufactured by the previously described known processes VAD, OVPO, and MCVD.

It is desired for the reason given below that the core-mother rod 21 contains predetermined thickness of cladding portion integrally wraps core portion. Description may now be given with reference to FIGS. 5A to 5C of the VAD process of forming core rod 21.

Figure 5A:
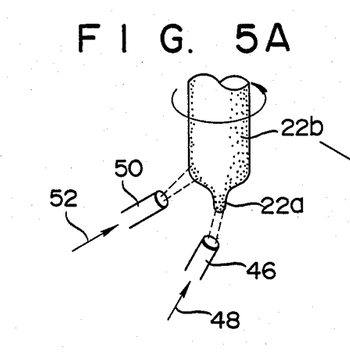
FIG. 5A to 5C set forth the sequential steps of fabricating a core-mother rod involved in the preform for asymmetrical optical fiber used in the embodiment of FIG. 4A to 4C.
Figure 5B:
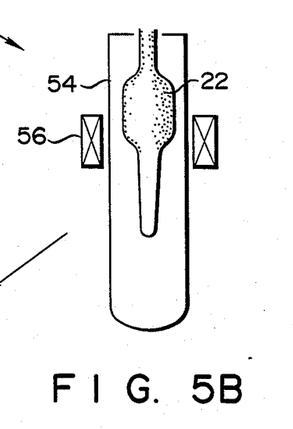
Figure 5C:
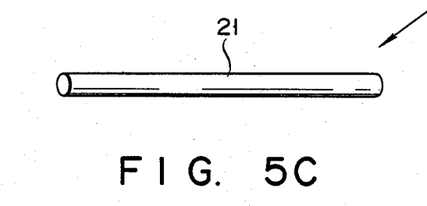

Referring to 5A, reference numeral 46 represents a burner for core soot. Raw gas 48 of core soot is supplied to burner 46. The core soot resulting from the reaction of the raw gas is sprayed and deposited on a support plane (not shown) which constitutes the distal end face of a quartz rod, thereby providing core-soot deposited rod 22a. Reference numeral 50 is a burner for ejecting cladding soot. Burner 50 is supplied with raw gas. The cladding soot generated by the reaction of raw gas is sprayed and deposited on the surface of rotating core-soot deposited rod 22a, therby providing cladding soot deposited layer 22b. A deposited mass of glass soot is thermally dehydrated in a furnace by applying a proper dehydrant such as $SOCl_2$. Heating temperature applied at this time is defined to be lower than that level at which core soot and cladding soot are fused to render deposited layers 22a, 22b are vitrified. Later, the preliminarily heated mass is held in tubular furnace 54 provided with heating means 56 (FIG. 5B). In this tubular furnace, the whole mass is turned into a transparent glass-like state. A glass bar produced in tubular furnace 54 is elongated to the predetermined diameter, thereby providing core-mother rod 21 (FIG. 5C).

Figure 6A:
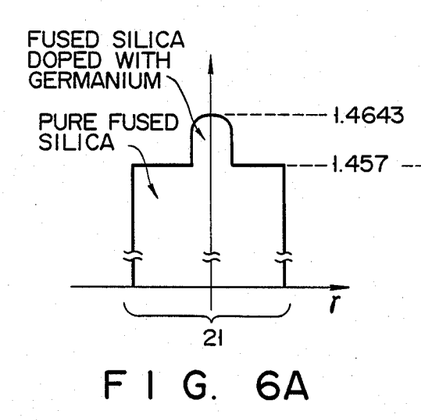
FIGS. 6A to 6B indicate the refraction index profile across the core-mother rod and stress-applying-mother rod used in the embodiment of FIG. 4A to 4C.

FIG. 6A indicates the refraction index profile across core rod 21 and glass composition thereof. As seen from the illustration, the refraction index (1.4643) of the core portion is made larger than that (1.457) of the cladding portion in order to ensure the prescribed property of an optical fiber. To attain the above-mentioned distribution of refraction index, the core portion is prepared from fused silica doped with germanium, and the cladding portion is composed of pure fused silica.

The cladding portion of core-mother rod 21 has a function of preventing the OH group released during the steps later described with reference to FIGS. 4B and 4C from approaching near the core portion. The reason why the intrusion of the OH group should be prevented is that the polarization-maintaining optical fiber is generally applied in the single mode. Namely, in the single mode, the cladding near the core also takes part in assisting the transmission of light beams. If, therefore, the OH group is retained in the neighborhood of the above-mentioned cladding near the core, light beams is noticeably absorbed, resulting in a large transmission loss. The aforementioned dehydration of the glass soot structure during the fabrication of core-mother rod 21 is intended to exclude the OH group from core-mother rod 21.

The cladding portion of the core-mother rod should have a certain thickness in order to fully exhibit its function. If the cladding portion is made underly thick, the undermentioned difficulties will arise. When an optical fiber shown in FIG. 2C is fabricated, an asymmetrical stress exerted by stress-applying parts 30 does not reach core 20, thus failing to ensure a full polarization effect. If, therefore, this fact is taken into account, it is preferred that cladding portion should have such a thickness as corresponds to about 4 times the diameter of core portion.

Figure 6B:
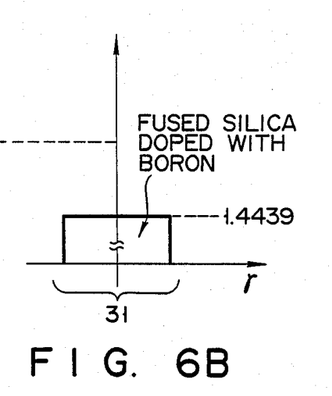

Stress-applying-mother rod 31 can also be prepared by the aforementioned VAD process. However, stress-applying parts 30 should have a larger thermal expansion coefficient than cladding 10. Further, as seen from the refractive index profile of FIG. 6B, stress-applying-mother rod 30 should have a smaller refractive index than cladding. When, therefore, cladding is formed of pure fused silica, and stress-applying rod 31 is prepared from fused silica, then it is advised to apply dopants capable of reducing the refractive index, for example, boron or fluorine. In this invention, the dopant concentration is defines to the about 15–20 mol % in the case of boron and about 2 mol % in the case of fluorine. Further, if required, germanium, too, may be applicable as a dopant. The dopant concentration of germanium is defined to be about 5-6 mol %, under the condition in which the refractive index does not become larger than 5 in the case of pure silica.

An assembly of mother rods fixed in the aforementioned manner is fitted to glass lathe 64 shown in FIG. 4B. While the assembly is rotated in the direction of the indicated arrow, the surface of rods 21, 31 is cleaned by flame polishing involving the application of burner 66. Flames should advisably be formed of a mixture of oxygen and hydrogen or high frequency plasma. If the surfaces of rods 21, 31 are considerably soiled, it is advised to add gases containing fluorine or chlorine to the flames, thereby to ensure the etching effect.

Figures 7, 8A, 8B:
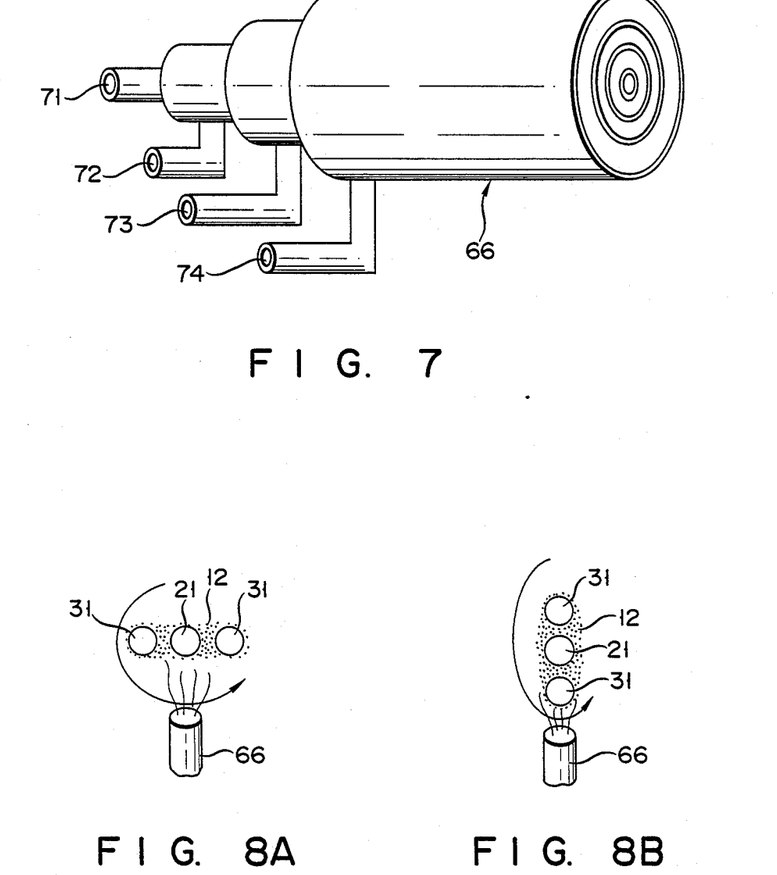
FIG. 7 is an enlarged view of burner 66 indicated in FIG. 4C.
FIG. 8A and 8B illustrate the manner in which glass soot is deposited in FIG. 4C.

Later as shown in FIG. 4C, glass soot 12 for cladding is sprayed around rods 21, 31, while the rod assembly is rotated in the direction of the indicated arrow. As a result, single porous cladding 91 is provided to wrap rods 21, 31. No limitation is imposed on the process of generating glass soot 12. In the VAD process, for example, it is possible to apply multilayer-burner 66. FIG. 7 is an enlarged view of the multi-layer-burner 66. Reference numeral 71 denotes a central tubular member; reference numeral 72 shows a second tubular member; reference 73 indicates a third tubular member; and reference 74 represents a fourth or outermost tubular member. Raw gas is supplied through the tubular members to produce glass by the CVD (chemical vapor deposition) process.

The deposition of porous cladding 91 by aforementioned multi-layer-burner 66 is performed, for example, under the following conditons.

(Types of raw gas and flow rate):
  Central or first tube:
    $SiCl_4$: 130 cc/min
    Ar (carrier): 200 cc/min
  Second tube $H_2$: 8000 cc/min
  Third tube Ar: 700 cc/min
  Fourth tube $O_2$: 8000 cc/min
(Burner traverse rate): 100 cc/min
(Rotation speed of rod assembly): constant
(Measurements of rods):
  Core rod length: 450 mm
  Diameter of core-mother rod 21: 12 mm
  Diameter of stress-applying-mother rod: 10 mm
(Density of porous cladding 91): 0.45 (upper limit)
(Time required deposition of glass soot): 11 hr
(Diameter of final preform): 52 mm (upper limit)

In the above-mentioned embodiment, the rotation of the rod assembly for the deposition of glass soot was set at the constant speed. However, the rotation need not be limited to the uniform speed, depending on the sectional shape of the intended optical fiber.

Namely, if it is intended to preform an optical fiber which finally assumes a substantially circular section, the rod assembly is rotated at a reduced speed when occupying the position of FIG. 8A, and at an elevated speed when set as indicated in FIG. 8B, thereby enabling glass soot 12 to be deposited in a large amount in an interspace between core rod 21 and stress-applying rod 31. Nor it is necessary to rotate the rod assembly all the time, but the glass soot may be deposited in the lengthwise direction with the rotating mother rod assembly brought to rest at the predetermined point. This process actually consists of the steps of rotating the rod assembly for a little while, and then stopping the rod rotation and depositing glass soot a second time in the lengthwise direction. This method is applicable where it is intended to prepare an optical fiber having various sectional shapes, and more effective in the case of a circular section.

Figure 9:
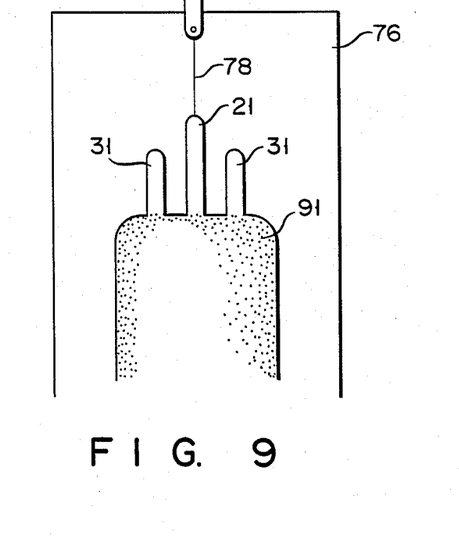
FIG. 9 shows the heating process for converting the porous preform obtained in FIG. 4C into a transparent preform.

The mother rod assembly wrapped with porous cladding 19 illustrated in FIG. 4C can be converted into a transparent preform by being heated in the furnace. During this process, the paired fixing jigs 58 (FIG. 4A) which have supported rods 21, 31 up to this point are removed. Then as shown in FIG. 9, the porous preform is held in furnace 76, while core-mother rod 21 exposed at the center of the porous cladding 91 is suspended by wire 78. It is advised that wire 78 be prepared from a material such as platinum which is possessed of high resistance to heat and corrosion. The reason why wire 78 is demanded to have high corrosion resistance is that where necessary, a corrosive gas of the chlorine or fluorine base may sometimes be supplied into furnace 76. The process (FIG. 9) of holding the porous preform in the furnace with paired jigs 58 removed has to be taken for the undermentioned reason.

Porous cladding 91 has a density of about 0.15–0.5 $g/cm^3$. When entirely converted into transparent glass by fusing, porous cladding 91 has its volume reduced to 1/6–½ of the original one. Since, however, porous cladding 91 is prevented from being shrinked in the lengthwise direction by embedded mother rods 21, 31, it is necessary for the porous cladding 91 to retain a degree of freedom for shrinkage in the radial direction. Unless, therefore, heating is applied without removing paired jigs 58, the obtained transparent preform has its section converted into an elliptic shape after vitrification (FIG. 10).

Figure 10:
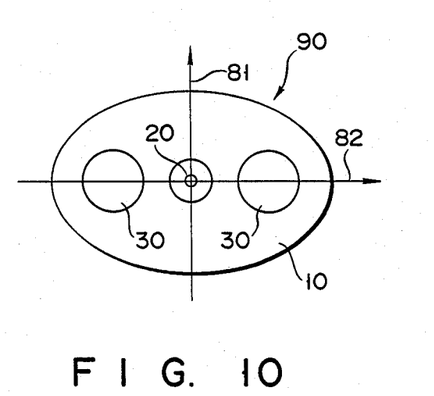
FIGS. 10 and 11 set forth the sectional view of a polarization-maintaining optical fiber obtained from the preform manufactured by the method of this invention.

Nevertheless, the elliptic shape oif FIG. 10 itself offers the undermentioned merits. When polarization-maintaining optical fibers are spliced together, it is necessary to be informed in advance of the polarizing plane in the transmitted light. In the case where a fiber has a circular section, an optical method has to be applied in order to define polarization axis. Since, however, in the case of the elliptic sectional shape of FIG. 10, shorter axis 81 and longer axis 82 coincide with the polarizing plane of transmitting light, the operation of splicing polarization-maintaining optical fibers is advantageously facilitated.

Figure 11:
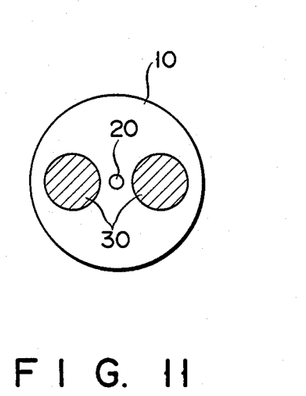

The properties of a polarization-maintaining optical fiber obtained by drawing the transparent preform obtained in the aforementioned embodiment in accordance with the conventional process of fabricating an optical fiber are show below:

Transmission loss: 0.25 dB/km (measured wave length: 1.55 microns)
  Cross-sectional shape: as illustrated in FIG. 11
  Beat length between the orthogonal modes 4 mm, Since, as mentioned previously, the conventional polarization-maintaining optical fiber is applied in a single mode, limitation is imposed on a relation between the core diameter and relative refraction index difference. When, therefore, the polarization-maintaining optical fiber is applied in a greater length than several meters, the undermentioned formula (1) has to be satisfied in order to guarantee the substantial single mode.

$$V = \frac{2\pi}{\lambda} \cdot an \sqrt{2\Delta} < 3$$

Consequently, deposited glass porous cladding 91 (FIG. 4C) should have its thickness so defined as to cause the finally obtained optical fiber to satisfy the above-mentioned condition.

Referring to the above formula (1), λ represents the operating wavelength; a means the radius of a core; n denotes the refractive index of the core; and Δ shows a relative refraction index difference.

Description may now be made of a method embodying the present invention for the preforming of a twin-core type optical fiber. The process described with reference to preforming a polarization-maintaining optical fiber is almost equally applied in the preforming of a twin-core type optical fiber. In this preforming process, however, the mother rod assembly has no member 21 to be connected to suspending wire 78 shown in FIG. 9 central projecting.

Figure 12:
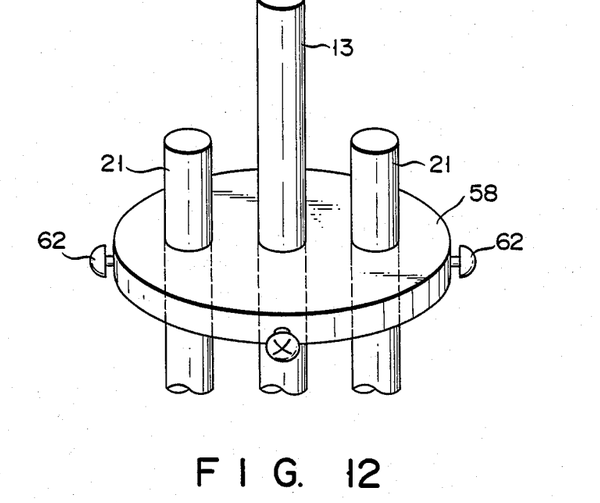
FIGS. 12 and 13 indicate the method for applying the present invention to the manufacture of a preform for a twin-core type optical fiber.

Consequently, the undermentioned processes may be selectively applied as occasion demands. The first process comprises, as shown in FIG. 12, the step of securing setting transparent glass bar 13 prepared from the same material as cladding glass at midpoint between two core-mother rods 21. Thereafter two core-mother rods 21 and a transparent glass bar 13 are securely fixed to jig 58, the same type of glass soot as previously described is deposited on the above-mentioned mother rod assembly. The resultant porous preform can be suspended in the furnace as in FIG. 9 by connecting wire 78 to transparent glass bar 13.

Figures 13, 14:
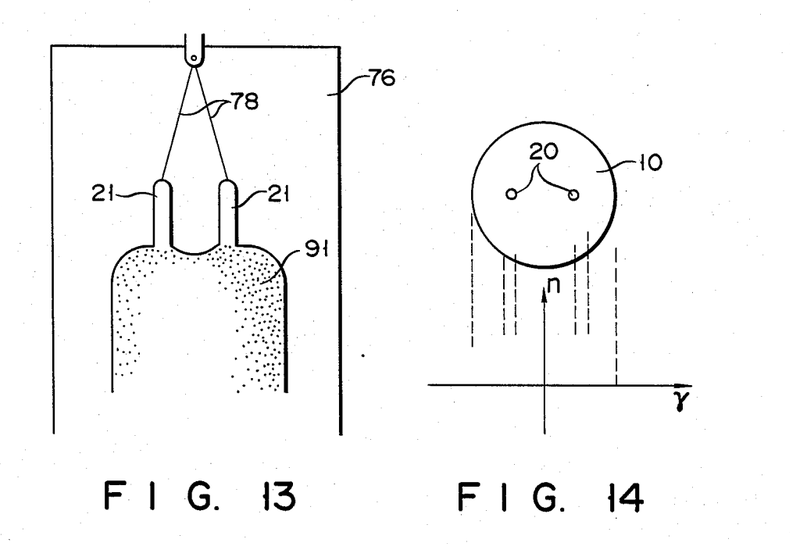
FIG. 14 is a sectional view of a twin-core type optical fiber obtained from a preform manufactured by the method illustrated in FIG. 13.

The second process comprises the step of suspending two core-mother rods by wires 78 as shown in FIG. 13. A twin-core type optical fiber obtained by either of the above-mentioned two preforming processes was drawn by the customary method. Determination was made of the properties of the samples of the twin-core type optical fiber, the results being set forth below.

Transmission loss (measured wavelength: 1.3 microns):
  0.55 dB/km (core 1)
  0.60 dB/km (core 2)
Sectional shape and refraction indices of the various portions of the core assembly: as shown in FIG. 14.

Unlike the conventional rod-in-tube method, the present invention can manufacture the preform for an asymmetrical optical fiber without perforating a drilled-pore, and consequently no limitations are imposed on the length of the preform.

In the present invention, the dimensional precision of the obtained preform depends on that of the mother rod assembly shown in FIG. 4A. Improvement in the dimensional precision of the mother rod assembly of the present invention can be realized more easily than in the perforation precision demanded of the conventional method. Therefore, the preform with high dimensional precision can be obtained.

Further, in the present invention, since a diffusion of impurity or a scratch can be excluded from an interface between cladding and core, the preform with low transmission loss can be obtained.

What is claimed is:
1. A method of manufacturing a preform for an asymmetrical optical fiber which comprises the steps of:
  (a) fixing and assembling a plurality of transparent glass rods in parallel relationship in a pair of jigs, to form a rod assembly, said plurality of glass rods including at least one core-mother rod functioning as a core in said optical fiber and including stress rods;
  (b) depositing glass soot around said rod assembly of said plurality of fixed glass rods by rotating said rod assembly and spraying the glass soot on said rod assembly while it is rotated, thereby forming a single porous glass cladding which surrounds all the glass rods and has a predetermined shape; and
  (c) removing said pair of jigs from said transparent glass rods and vitrifying said porous glass cladding to a single transparent cladding by thermal fusion, thereby forming an entire integral transparent preform which can be drawn into an asymmetrical optical fiber, said transparent cladding having a smaller refractive index than said at least one core-mother rod.

2. The method of claim 1, comprising fixing and assembling only one core-mother rod functioning as said core in said optical fiber, and two stress-applying-mother rods functioning as stress-applying parts in said optical fiber.

3. The method of claim 1, comprising fixing and assembling two core-mother rods functioning as said core in said optical fiber.

4. The method of claim 1, comprising controllably rotating said rod assembly during said spraying of said glass soot so as to cause said porous glass cladding to have a predetermined cross sectional shape.

5. The method of claim 4, comprising controllably rotating said rod assembly during said spraying of said glass soot so as to cause said porous glass cladding to have a substantially circular cross sectional shape.

6. The method of claim 4, comprising controllably rotating said rod assembly during said spraying of said glass soot so as to cause said porous glass cladding to have a substantially elliptical cross sectional shape.

7. The method of claim 1, wherein each of said jigs in which said glass rods are assembled comprises a disk-shaped jig which has a plurality of openings to securely hold said plurality of transparent glass rods in parallel relationship.

8. The method of claim 1, wherein said removing said paired jigs from said transparent glass rods is carried out before carrying out said vitrifying step.

9. The method of claim 8, wherein said vitrifying step is conducted while suspending said rod assembly with said porous cladding thereon in a heating furnace by means of a wire connected to an upper end portion of said glass rods.

10. The method of claim 1, further comprising removing OH groups from said core and from said cladding.

11. The method of claim 10, wherein said cladding is applied to have a thickness of about 4 times the diameter of said core.

12. The method of claim 1, wherein said cladding is applied to have a thickness of about 4 times the diameter of said core.

* * * * *